(12) United States Patent
Kearney et al.

(10) Patent No.: US 11,535,081 B1
(45) Date of Patent: Dec. 27, 2022

(54) CLIMATE CONTROL SYSTEM WITH SLIT-VENT FLUID DELIVERY

(71) Applicants: John M. Kearney, San Mateo, CA (US); Clarisse Mazuir, San Jose, CA (US); Arthur Y. Zhang, San Jose, CA (US); Samuel B. Schaevitz, Los Gatos, CA (US)

(72) Inventors: John M. Kearney, San Mateo, CA (US); Clarisse Mazuir, San Jose, CA (US); Arthur Y. Zhang, San Jose, CA (US); Samuel B. Schaevitz, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 283 days.

(21) Appl. No.: 16/940,732

(22) Filed: Jul. 28, 2020

Related U.S. Application Data

(63) Continuation of application No. 15/606,179, filed on May 26, 2017, now Pat. No. 10,752,082.

(60) Provisional application No. 62/341,687, filed on May 26, 2016.

(51) Int. Cl.
*B60H 1/24* (2006.01)
*B60H 1/00* (2006.01)

(52) U.S. Cl.
CPC ....... *B60H 1/00685* (2013.01); *B60H 1/0025* (2013.01); *B60H 1/00028* (2013.01); *B60H 1/00035* (2013.01); *B60H 1/00007* (2013.01); *B60H 1/00021* (2013.01); *B60H 1/00642* (2013.01); *B60H 1/00664* (2013.01); *B60H 1/00671* (2013.01); *B60H 2001/00092* (2013.01); *B60H 2001/00114* (2013.01); *B60H 2001/00721* (2013.01)

(58) Field of Classification Search
USPC .......................................... 454/152–156, 158
See application file for complete search history.

(56) References Cited

U.S. PATENT DOCUMENTS

| 3,101,038 | A | | 8/1963 | Archer | |
|---|---|---|---|---|---|
| 3,811,369 | A | * | 5/1974 | Ruegg | F24F 13/072 454/304 |
| 5,478,276 | A | * | 12/1995 | Lee | F24F 11/30 356/627 |
| 5,599,229 | A | | 2/1997 | Claunch et al. | |
| 6,942,563 | B2 | | 9/2005 | Pesch et al. | |
| 6,966,829 | B1 | | 11/2005 | Hier et al. | |
| 8,259,984 | B2 | | 9/2012 | van der Bilt | |
| 8,641,489 | B2 | | 2/2014 | Dubief et al. | |
| 10,099,536 | B2 | * | 10/2018 | Albin | B60H 1/3421 |
| 2004/0072532 | A1 | * | 4/2004 | Cho | B60H 3/0028 454/155 |

(Continued)

*Primary Examiner* — Ko-Wei Lin
(74) *Attorney, Agent, or Firm* — Young Basile Hanlon & MacFarlane, P.C.

(57) ABSTRACT

A fluid delivery module includes a housing defining a fluid flow path between an inlet and an outlet. The housing includes a top surface portion and a bottom surface portion that are movable to vary a flow direction of a fluid flow along the fluid flow path. The fluid delivery module includes an outlet treatment movable to vary a flow rate of the fluid flow exiting the outlet and a control unit configured to send commands to move at least one of the top surface portion, the bottom surface portion, or the outlet treatment according to a fluid delivery profile that dictates a flow pattern of the fluid flow.

20 Claims, 5 Drawing Sheets

(56) References Cited

U.S. PATENT DOCUMENTS

| | | | |
|---|---|---|---|
| 2007/0017194 A1* | 1/2007 | Gehring | B60H 1/3407 55/505 |
| 2007/0046452 A1 | 3/2007 | Anderson et al. | |
| 2008/0153408 A1* | 6/2008 | Thomas | A61L 9/14 422/123 |
| 2008/0254734 A1 | 10/2008 | Uenaka et al. | |
| 2008/0314061 A1 | 12/2008 | Nagami et al. | |
| 2009/0036046 A1* | 2/2009 | Gehring | B60H 1/3407 454/162 |
| 2009/0093206 A1 | 4/2009 | Okita et al. | |
| 2009/0318069 A1* | 12/2009 | Konet | B60H 1/00742 454/75 |
| 2010/0011799 A1* | 1/2010 | Sakakibara | B60H 1/3414 165/104.34 |
| 2010/0124876 A1 | 5/2010 | Yu et al. | |
| 2010/0323603 A1* | 12/2010 | Lans | F24D 19/0085 55/496 |
| 2011/0048050 A1* | 3/2011 | Moteki | F24F 1/0059 62/263 |
| 2013/0149952 A1* | 6/2013 | Demerath | B60H 1/3421 454/155 |
| 2013/0344791 A1* | 12/2013 | Wang | B60H 1/00871 454/155 |
| 2014/0131026 A1* | 5/2014 | Hurd | B60H 1/00842 165/204 |
| 2014/0179212 A1 | 6/2014 | Space et al. | |
| 2014/0194047 A1* | 7/2014 | An | B60H 1/00064 454/155 |
| 2014/0301832 A1* | 10/2014 | Errick | B60H 1/3407 415/151 |
| 2014/0302769 A1* | 10/2014 | Sawada | B60H 1/3421 454/315 |
| 2014/0357179 A1* | 12/2014 | Londiche | C22C 38/44 454/322 |
| 2015/0224853 A1 | 8/2015 | Errick et al. | |
| 2015/0273984 A1* | 10/2015 | Suzuki | B60K 35/00 454/152 |
| 2015/0292751 A1* | 10/2015 | Thompson | F24F 11/83 126/110 A |
| 2016/0001638 A1* | 1/2016 | Rottmann | B60H 1/3421 454/155 |
| 2016/0152116 A1* | 6/2016 | Albin | B60H 1/3421 454/155 |
| 2016/0250909 A1* | 9/2016 | Schneider | B60H 1/3421 454/155 |
| 2017/0120721 A1* | 5/2017 | Zhang | B60H 1/345 |
| 2017/0253107 A1* | 9/2017 | Castiglioni | B60H 1/3421 |
| 2017/0254548 A1* | 9/2017 | Song | F24F 1/0011 |
| 2017/0336083 A1* | 11/2017 | Shirota | F24F 13/14 |
| 2017/0347219 A1 | 11/2017 | McCauley et al. | |
| 2018/0043752 A1* | 2/2018 | Motomura | B60H 1/242 |

* cited by examiner

CLIMATE CONTROL SYSTEM WITH SLIT-VENT FLUID DELIVERY

CROSS-REFERENCE TO RELATED APPLICATION(S)

This application is a continuation of U.S. patent application Ser. No. 15/606,179, filed May 26, 2017, and entitled "Climate Control System with Slit-Vent Fluid Delivery," which claims priority to U.S. Provisional Application Ser. No. 62/341,687, filed May 26, 2016, and entitled "Climate Control System with Slit-Vent Fluid Delivery," the contents of which are incorporated herein by reference.

FIELD

This disclosure relates generally to the field of vehicle climate control systems. More particularly, the disclosure relates to a low-profile, slit-vent fluid delivery module leveraging internal fluidic control devices to vary a fluid delivery profile.

BACKGROUND

Vehicle climate control systems are designed to change environmental conditions such as humidity and temperature within a vehicle cabin. Many climate control systems adjust environmental conditions by providing thermally conditioned fluid, generally air, to the vehicle cabin using a series of ducts, outlets, and user-manipulated directional control devices. For example, many climate control systems include manually-adjustable vanes or registers positioned across rectangular duct outlets located on interior surfaces such as the instrument panel or the center console within the vehicle. These outlet and vane combinations use a large amount of space within the vehicle and grant a limited amount of fluid delivery control to the user.

SUMMARY

The disclosure relates to fluid delivery modules and climate-control methods. In one aspect of the disclosure, a fluid delivery module includes a housing defining a fluid flow path between an inlet and an outlet. The outlet has a slit-like shape and is not visible within a sight line of a user. The fluid delivery module further includes a fluidic control device disposed within the housing between the inlet and the outlet. The fluidic control device is movable to vary a direction of the fluid flow path within the housing.

In another aspect of the disclosure, a climate-control method includes receiving information associated with a fluid delivery profile based on a user input at a control unit and sending, from the control unit, a command to modify movement of a fluidic control device within a fluid delivery module based on the fluid delivery profile. The fluid delivery profile defines a pattern of fluid flow exiting an outlet of the fluid delivery module.

In another aspect of the disclosure, the fluid delivery module includes a housing defining a fluid flow path between an inlet and an outlet, a fluidic control device disposed within the housing between the inlet and the outlet and movable to vary a direction of the fluid flow path within the housing according to a fluid delivery profile, and an outlet treatment disposed proximate to the outlet and comprising at least one of a porous material covering the outlet, a shutter device movable to alter a cross-sectional area of the outlet, or a lighting feature masking visibility of the outlet from a location outside the housing.

BRIEF DESCRIPTION OF THE DRAWINGS

The disclosure is best understood using the following detailed description in conjunction with the accompanying drawings. Similar reference numerals in the drawings designate similar elements. Note that the dimensions of the various features can be expanded or reduced for clarity.

DETAILED DESCRIPTION

A fluid delivery module with a slit-vent, low-profile outlet providing fluid flow according to a variety of fluid delivery profiles controlled by user input is described. The fluid delivery module includes a housing defining a fluid flow path between an inlet and the slit-vent, low-profile outlet, The outlet is generally not visible to the user based on a location of the outlet in respect to other components within a sight line of the user, a shape and size of the outlet, or use of various outlet treatments to hide the outlet from view. The housing includes one or more fluidic control devices movable to vary a direction of the fluid flow path within the housing in order to implement the fluid delivery profiles. The fluid can be a gas and/or a liquid. Examples of the fluid include air, water, and scented media such as oil, the provision of each being controlled in content and direction in order to meet the desired fluid delivery profile.

Figure 1:
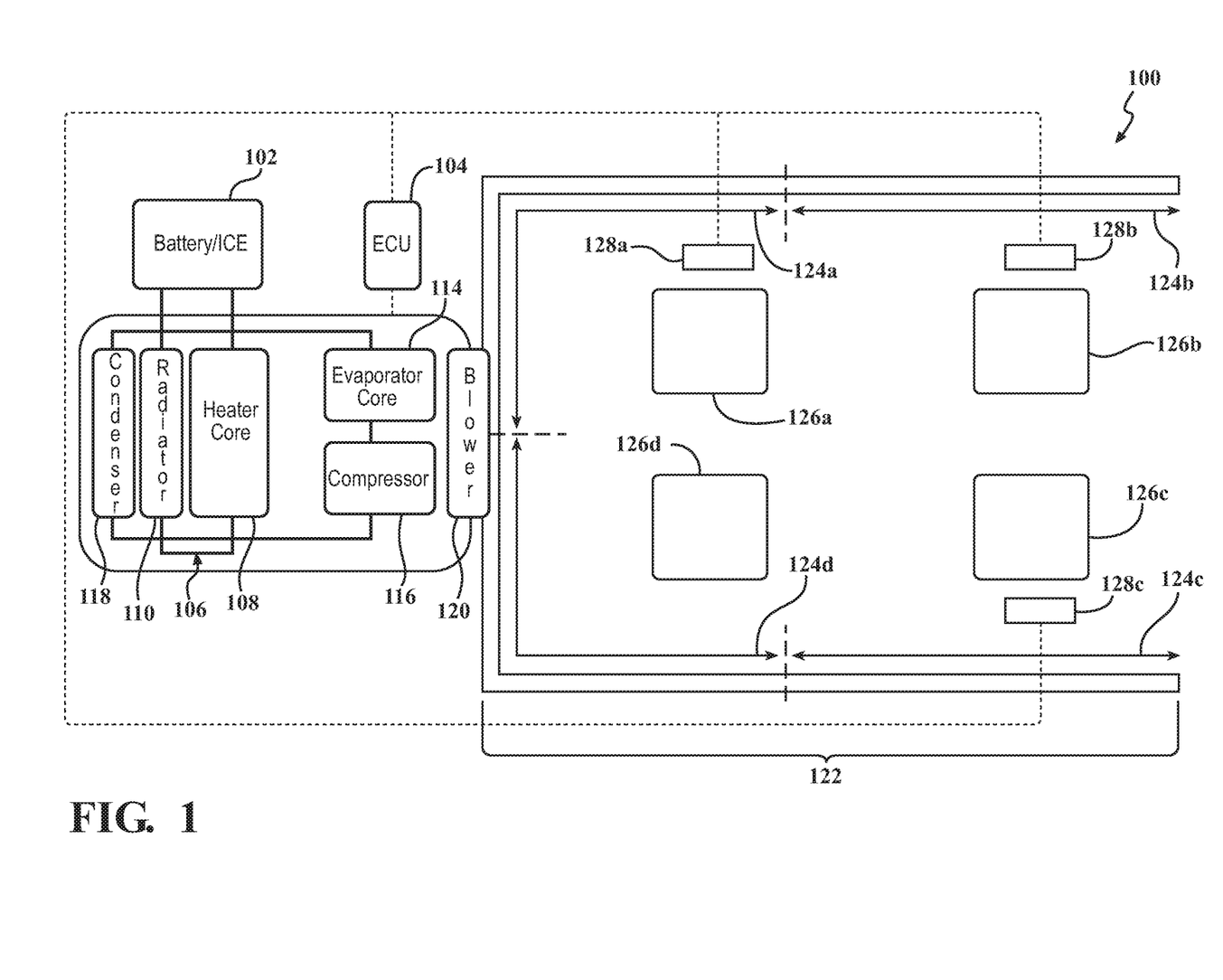
FIG. 1 shows a schematic view of a climate control system for a vehicle.

FIG. 1 shows a schematic view of a climate control system usable, for example, with a vehicle 100. The vehicle 100 can include a power unit, a thermal transfer module, and a control unit. The power unit can be an internal combustion engine and/or a battery 102 that provides both heat and power to the thermal transfer module, the control unit, and/or any other components or systems within the vehicle 100 that require electrical energy or thermal conditioning to operate. The control unit can be an ECU 104 configured to control the various components of the thermal transfer module.

The thermal transfer module can include a heating module 106. The heating module 106 can include the battery 102, a heating element, such as a heater core 108, and a cooling element, such as a radiator 110. The heating module 106 can circulate a working fluid, such as a glycol-based coolant, between the battery 102, the heater core 108, and the radiator 110 to generate heat for the heating module 106. Other examples of working fluids include water and air. The working fluid is separate from the fluid flow delivered to a user as described in additional detail below, as the working fluid is generally used to thermally condition the fluid flow.

The thermal transfer module can also include a cooling module 112. The cooling module 112 can include cooling elements such as an evaporator core 114, a compressor 116, and a condenser 118 that function in a traditional manner, for example, as a vehicle-based air conditioner. The cooling module 112 can circulate a second working fluid, such as refrigerant, between the evaporator core 114, the compressor 116, and the condenser 118 to generate cooling for the cooling module 112. Again, the second working fluid is separate from the fluid flow delivered to the user, as the second working fluid is also generally used to thermally condition the fluid flow.

The thermal transfer module can also include a blower 120 and a fluid delivery module 122. The blower 120 can draw the fluid delivered to the user, such as air or water in the case of added humidity, through the heater core 108 and the evaporator core 114 in order to thermally condition the fluid entering the fluid delivery module 122. The fluid delivery module 122, though shown here only schematically, can be designed to direct the conditioned fluid to various locations within the vehicle 100. In one example, the fluid delivery module 122 can be divided into portions or zones 124a-d with each of the zones 124a-d covering only some portion of the fluid delivery module 122. Each zone 124a-d can be located proximate to one of the seats 126a-d within the vehicle 100. Though four zones 124a-d of the fluid delivery module 122 are shown in FIG. 1 as generally aligned with the seats 126a-d in the vehicle 100, additional zones can be positioned at a variety of locations in the vehicle 100 to supply the conditioned fluid.

Each of the zones 124a-d can include at least one low-profile outlet for the fluid delivery module 122, with the outlet being hidden from view based on a location of the outlet in respect to other components within the vehicle. In other words, the outlet is not visible in respect to user sight lines. For example, in the zones 124a and 124d, the outlet of the fluid delivery module 122 can be located along a lower portion of an instrument panel such that an upper portion of the instrument panel hides the outlet from view of the seats 126a and 126d. In another example, applicable to all of the zones 124a-d, the outlet of the fluid delivery module 122 can be located along a belt line of the door such that a trim component hides the outlet from view of the seats 126a-d. Other locations for the outlet include within a foot well, along a roof line, hidden by a trim component of the headliner, etc. The examples of components that block the outlet from view are non-limiting.

The ECU 104 can be used to control the heating module 106, the cooling module 112, the blower 120, and the fluid delivery module 122 to condition and deliver fluid according to a fluid delivery profile that is determined based on a user input to the climate control system. For example, users located in the seats 126a-c can each possess a mobile device 128a-c. The mobile devices 128a-c can include interfaces allowing the respective user to select, for example, a fluid delivery profile for the user's respective zone 124a-c that dictates the speed/intensity, temperature, flow pattern, types of fluid such as air, water, or scented oil, and/or overall direction of the fluid being delivered to the user by the fluid delivery module 122 in the respective zone 124a-c.

In another example, the fluid delivery profile can be determined automatically by the ECU 104 in order to provide specific fluid types, temperatures, speeds/intensities, humidity levels, flow patterns, etc. within the vehicle 100. Other means of selecting the fluid delivery profile are also possible, such as by an input received through an interface (not shown) within the vehicle 100 or data provided to the ECU 104 by sensors (not shown) located throughout the vehicle 100. The fluid delivery module 122 can also include fluidic control devices used to adjust the direction, flow rate, flow pattern, etc. of fluid provided from each zone 124a-d without impacting other zones 124a-d.

Details of various embodiments of the fluid delivery module 122 and the fluidic control devices are described in reference to FIGS. 2-6 below. The ECU 104 can be implemented to control the heating module 106, the cooling module 112, the blower 120, the fluid delivery module 122, and the fluidic control devices as described with respect to a computing device further detailed in FIG. 7. Though rotatable fluidic control devices are described in reference to FIGS. 2-6 below, other types of fluidic control devices, such as pressure-changing air bladders and shape-changing shape-memory alloy devices can also be used to control a direction of fluid flow within the fluid delivery module 122.

Figure 2:
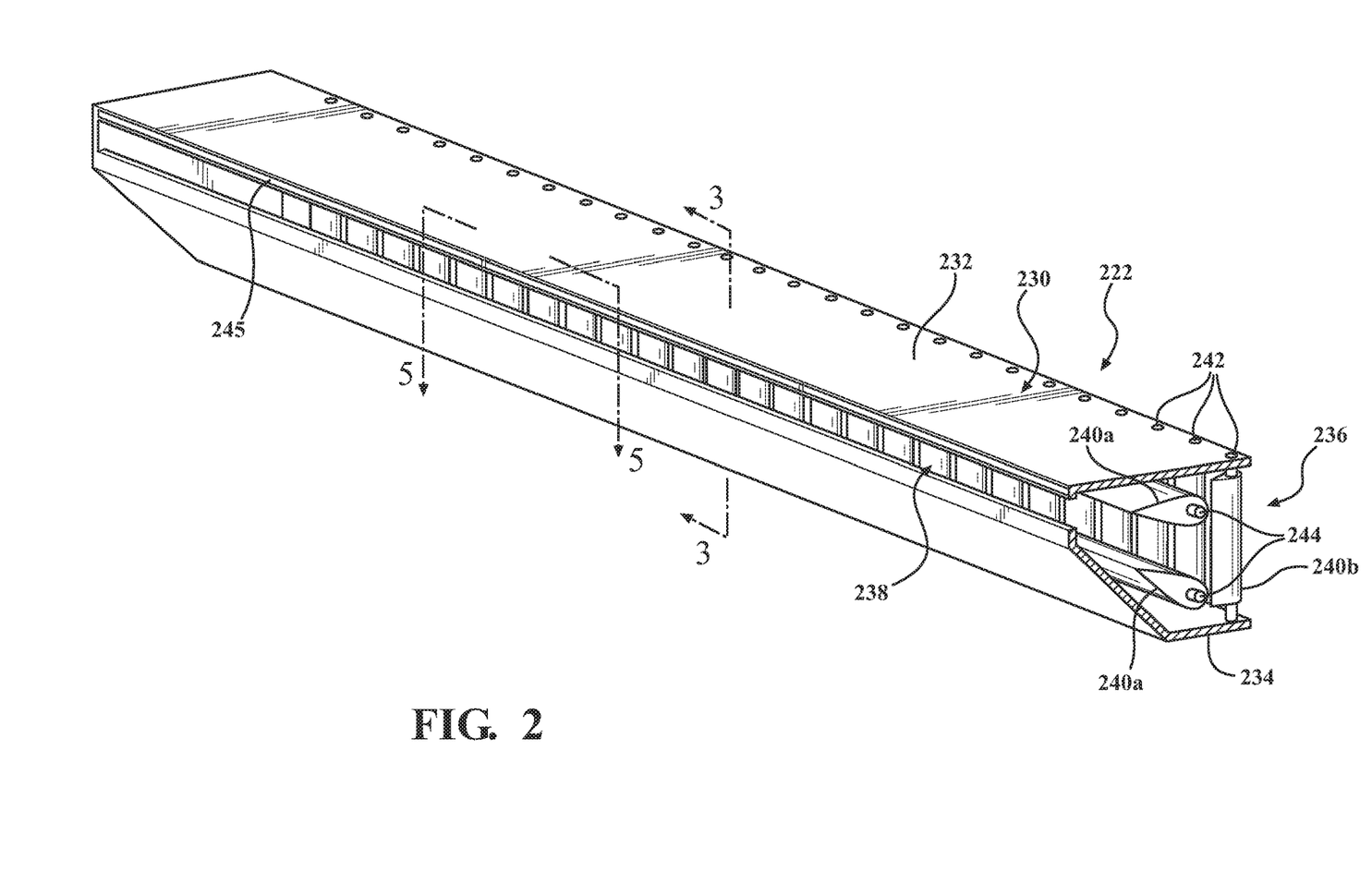
FIG. 2 shows a cutaway front perspective view of a slit-vent fluid delivery module in the climate control system of FIG. 1.

FIG. 2 shows a cutaway front perspective view of a slit-vent fluid delivery module 222 in the climate control system of FIG. 1. The slit-vent fluid delivery module 222 includes a housing 230 comprising a top surface 232 and a bottom surface 234 between which are defined an inlet 236 and an outlet 238. A fluid flow path (further described in the sectional views of FIGS. 3 and 4 below) extends through the housing 230 between the top surface 232 and the bottom surface 234 from the inlet 236 to the outlet 238. Two types of fluidic control devices 240a-b are disposed within the housing 230 between the inlet 236 and the outlet 238.

The inlet 236 in the example of FIG. 2 has a generally rectangular shape, and a width of the inlet 236 can be generally equivalent to a width of the outlet 238. A height of the inlet 236 can be greater than a height of the outlet 238. In one example, a cross-sectional area of the inlet 236 (here, the height multiplied by the width) can be at least an order of magnitude greater than a cross-sectional area of the outlet 238. The outlet 238 in the example of FIG. 2 has a generally rectangular, slit-like shape in that the width of the outlet 238 is at least an order of magnitude greater than a height of the outlet 238. In one example, the height of the outlet 238 can vary between fifty microns and one centimeter and the width of the outlet 238 (and in this example, the inlet 236) can vary between ten centimeters and several meters.

The tapered shape of the bottom surface 234 of the housing 230 and the difference between the cross-sectional area of the inlet 236 and the outlet 238 are such that an increase in fluid flow speed and a decrease in fluid flow pressure will occur as fluid, for example, humidified air, travels along the fluid flow path between the inlet 236 and the outlet 238. The placement and shape of the top surface 232 and the bottom surface 234 as well as the size and shape of the inlet 236 and the outlet 238 can be modified to control a pressure differential between the inlet 236 and the outlet 238 such that the slit-vent fluid delivery module 222 can be used to provide fluid according to a variety of fluid delivery profiles.

The fluidic control devices 240a-b disposed between the inlet 236 and the outlet 238 are movable to vary a direction of the fluid flow path within the housing 230. For example, the fluidic control devices 240a that extend from the top surface 232 to the bottom surface 234 near the inlet 236 include pivots 242 around which the fluidic control devices 240a can be controlled to rotate. Similarly, the fluidic control devices 240b that extend transversely across the housing 230 include pivots 244 around which the fluidic control devices 240b can be controlled to rotate. The fluidic control devices 240a-b can be rotated to vary the direction of fluid flow along the fluid flow path in order to control fluid delivery from the outlet 238. Operation of the fluidic control devices 240a-b can be directed by the ECU 104 of FIG. 1. Additional details and control features of the fluidic control devices 240a-b are described in reference to the sectional views of the slit-vent fluid delivery module 222 in FIGS. 3-6 below.

Figure 3:
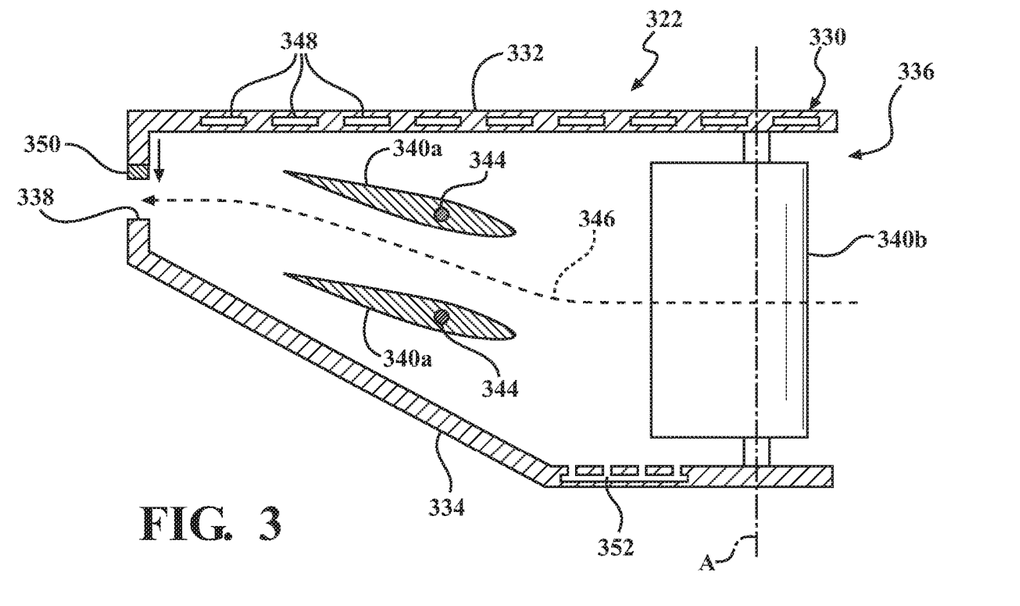
FIG. 3 shows a vertical sectional view through section 3-3 of the slit-vent fluid delivery module of FIG. 2.

FIG. 3 shows a vertical sectional view through section 3-3 of the slit-vent fluid delivery module 222 of FIG. 2. In the FIG. 3 example, a slit-vent fluid delivery module 322 includes a housing 330 having a top surface 332 and a bottom surface 334 defining a fluid flow path 346 generally designated using a dotted line between an inlet 336 and an outlet 338. Two types of fluidic control devices 340a-b are disposed within the housing 330, the transverse fluidic control devices 340a having an airfoil shape and rotatable about pivots 344 and the vertical fluidic control device 340b extending between the top surface 332 and the bottom surface 334 and rotatable about an axis A.

In addition to the outlet 338 having a slit-like shape such that the outlet 338 is generally hidden from view of a user, the transverse fluidic control devices 340a are spaced from the outlet 338 such that movement of the transverse fluidic control devices 340a is not visible to a user through the outlet 338 from a location outside of the housing 330. For example, the transverse fluidic control devices 340a would not be visible to users located in the seats 126a-d of the vehicle 100 of FIG. 1 through the outlet 338 should the outlet 338 be located along an instrument panel, along a door belt line, or along a headliner of the vehicle 100 as non-limiting examples. Lack of visibility of the movement of the transverse fluidic control devices 340a can be based on the location of the transverse fluidic control devices 340a within the housing in respect to the location of the outlet 338, the shape of the top surface 332 and the bottom surface 334 near the outlet 338 as having, for example, a lip or edge, and/or a diminutive height of the outlet 338 that forms the slit-like shape of the outlet 338. Movement of the transverse fluidic control devices 340a can provide a fine level of directional control to the fluid exiting the outlet 338.

The vertical fluidic control device 340b in the example of FIG. 3 is located proximate to the inlet 336. Given the spacing between the outlet 338 and the vertical fluidic control device 340b as well as the location of the vertical fluidic control device 340b upstream of the transverse fluidic control device 340a, the vertical fluidic control device 340b can also be blocked from view of a user through the outlet 338 from a location outside the housing 330. The vertical fluidic control device 340b can provide a coarse level of directional control to the fluid exiting the outlet 338. Movement of both types of fluidic control devices 340a-b can be controlled by a control unit, such as the ECU 104 of FIG. 1, based on an input received, for example, from a user that defines a fluid delivery profile.

Using the coarser directional control of the vertical fluidic control device 340b and the finer directional control of the transverse fluidic control devices 340a in combination with a variation in, for example, fan speeds, fluid delivery profiles of varying patterns can be achieved by the slit-vent fluid delivery module 322. For example, a breeze-style pattern or profile can include generating semi-random or oscillating fluid flow exiting the outlet 338. In another example, an open-window-style or open-sunroof-style pattern or profile can include generating sinusoidal direction changes in the fluid flow exiting the outlet 338 without the need for an open window or an open sunroof in the vehicle 100.

The slit-vent fluid delivery module 322 can also include thermal transfer devices such as thermal passages 348 adjacent to, or as shown in the example of FIG. 3, within the top surface 332. The thermal passages 348 can carry one or more thermally conditioned working fluids, such as water, coolant-based glycol, refrigerant, air, etc. that can heat or cool the fluid flow along the fluid flow path 346 for at least a portion of the slit-vent fluid delivery module 322. Using thermal passages 348 in combination with a main thermal module such as that shown in FIG. 1 allows for general heating and cooling of fluid flow as delivered to the entire slit-vent fluid delivery module 322 and site-specific or zone-specific heating and cooling delivered by portions of the slit-vent fluid delivery module 322 that can be aligned with inputs or fluid delivery profiles selected by various users in the vehicle 100.

The slit-vent fluid delivery module 322 can also include an outlet treatment such as a shutter 350. In addition to hiding the outlet 338 from view of a user by further diminishing a cross-sectional area of the outlet 338, the shutter 350 can be controlled to alter the cross-sectional area of the outlet 338 in order to change the characteristics of the fluid flow exiting the outlet, for example, to generate oscillations or bursts of fluid flow consistent with a breeze-style pattern, an open-window-style pattern, or an open-sunroof-style pattern. Other fluid flow patterns can also be generated based in part of a position of the shutter 350.

Another outlet treatment suitable for use with the slit-vent fluid delivery module 322 to hide visibility of the outlet 338 is a lighting feature (e.g., lighting feature 245 shown in FIG. 2) that can be located proximate to the outlet 338 in order to mask visibility of the outlet 338 from any location or user sight line outside the housing 330. The lighting feature can provide accent lighting or highlighting of certain areas of the vehicle while at the same time making it difficult for users in various positions within the seats 126a-d to see the outlet 338. The lighting feature could also be used to represent characteristics of the fluid flow exiting the outlet 338. Characteristics of fluid flow represented by, for example, different colors or patterns of light can include temperature, speed, fluid type, fluid direction, etc.

The slit-vent fluid delivery module 322 can also include an olfactory passage 352. The olfactory passage 352 can be used to deliver scented fluid such as scented oil in the form of a mist to the fluid flow path 346 according to the fluid delivery profile. For example, the fluid delivery profile selected by a user can be an ocean-breeze profile. In this example, the fluidic control devices 340a-b can move in a pattern to deliver a breeze-like fluid flow through the outlet 338 and the olfactory passage 352 can be used to infuse the main fluid, in this case, air, with scented oils or other fluids that give the impression of salt, sand, or sea creature to the user. In other examples, other scents, such as bonfires, evergreen trees, spring flowers, etc. can be associated with other fluid-delivery profiles selectable by a user.

Figure 4:
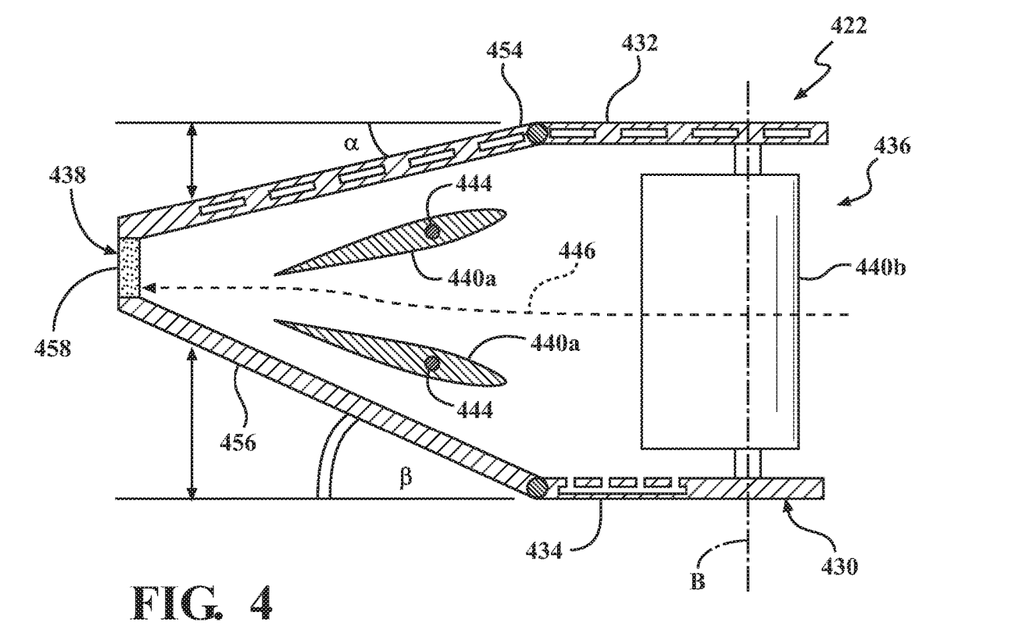
FIG. 4 shows another vertical sectional view through section 3-3 of the slit-vent fluid delivery module of FIG. 2.

FIG. 4 shows another vertical sectional view through section 3-3 of the slit-vent fluid delivery module 222 of FIG. 2. In the FIG. 4 example, the slit-vent fluid delivery module 422 includes a housing 430 having a top surface 432 and a bottom surface 434 defining a fluid flow path 446 generally designated using a dotted line between an inlet 436 and an outlet 438. Two types of fluidic control devices 440a-b are disposed within the housing 430, the transverse fluidic control devices 440a having an airfoil shape and rotatable about pivots 444 and the vertical fluidic control device 440b extending between the top surface 332 and the bottom surface 334 and rotatable about an axis B. The fluidic control devices 440a-b operate in a manner similar to that described in respect to the fluidic control devices 340a-b of FIG. 3.

The slit-vent fluid delivery module 422 of FIG. 4 can also include a top surface portion 454 and a bottom surface portion 456, both of which are movable to alter a cross-sectional area of the outlet 438. The top surface portion 454 is shown as rotated at an angle α in respect to the top surface 432. The bottom surface portion 456 is shown as rotated at an angle β in respect to the bottom surface 434. Though shown as slightly different angles in FIG. 4, the angles α and β can be equal, can differ slightly, or can differ greatly depending on the fluid delivery profile being executed by the slit-vent fluid delivery module 422. The ECU 104 can be used to modify the angle α and/or the angle β to change the fluid flow path 446 to meet a specific fluid delivery profile.

The slit-vent fluid delivery module 422 can also include an outlet treatment such as a porous material 458 that both hides visibility of the outlet 438 and implements various fluid delivery profiles. For example, the porous material 458 can be controlled in order to change the characteristics of the fluid flow exiting the outlet 438, for example, to restrict the flow, to change the direction of the flow, or to oscillate the flow to meet a variety of flow patterns corresponding to a variety of fluid delivery profiles. The porous material 458 can also be semi-porous, have variable porosity, have a variety of colors or shadings, and can hide the outlet 438 from view of a user while at the same time only minimally impacting the fluid flow path 446 at the outlet 438. Examples of the porous material 458 include a ferromagnetic fabric with controllable chains, a roller-blind-style cover, and a flexible fabric with openings of varying sizes depending on how taught the fabric is stretched.

Figure 5:
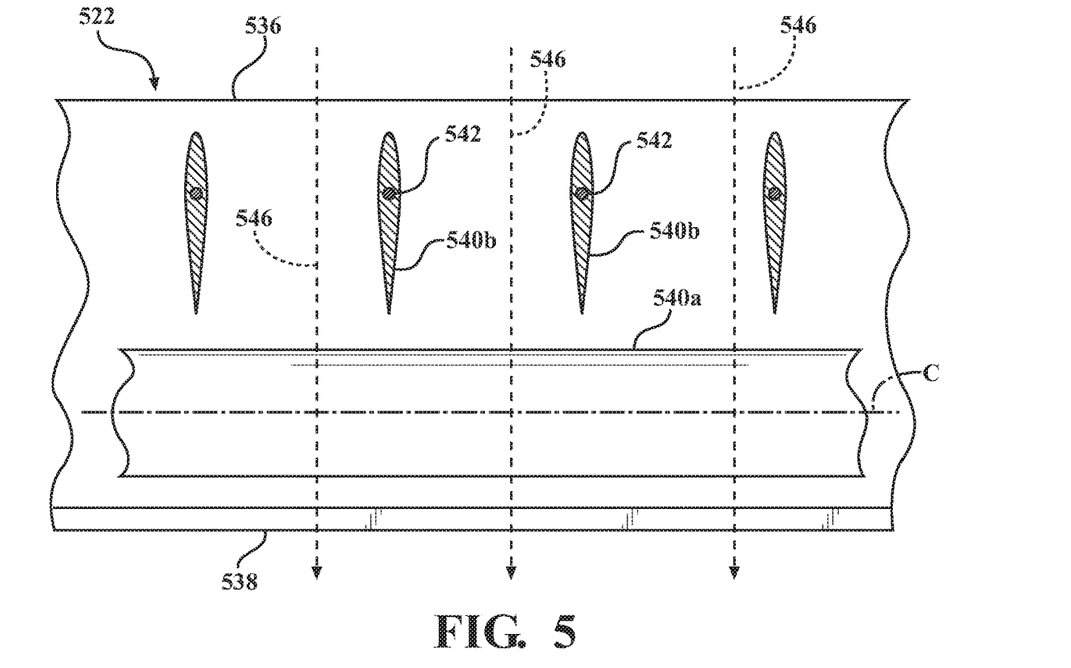
FIG. 5 shows a horizontal sectional view through section 5-5 of the slit-vent fluid delivery module of FIG. 2.

FIG. 5 shows a horizontal sectional view through section 5-5 of the slit-vent fluid delivery module 222 of FIG. 2. In the FIG. 5 example, the slit-vent fluid delivery module 522 extends from an inlet 536 to an outlet 538. Two types of fluidic control devices 540a-b are disposed between the inlet 536 and the outlet 538, the transverse fluidic control device 540a rotatable about axis C and the spaced, vertical fluidic control devices 540b having airfoil shapes and rotatable about pivots 542. The fluidic control devices 540a-b operate in a manner similar to that described in respect to the fluidic control devices 340a-b of FIG. 3.

With the spaced, vertical fluidic control devices 540b oriented in a manner that is generally perpendicular to cross-sectional areas of the inlet 536 and the outlet 538, fluid flow paths 546 can extend between the vertical fluidic control devices 540b. Similarly, with the transverse fluidic control device 540a oriented in a manner that is also generally perpendicular to the cross-sectional areas of the inlet 536 and the outlet 538, the fluid flow paths 546 can further extend across a surface of the transverse fluidic control device 540a as shown. With the fluidic control devices 540a-b in the shown orientation, the fluid flow paths 546 are generally unobstructed between the inlet 536 and the outlet 538.

Figure 6:
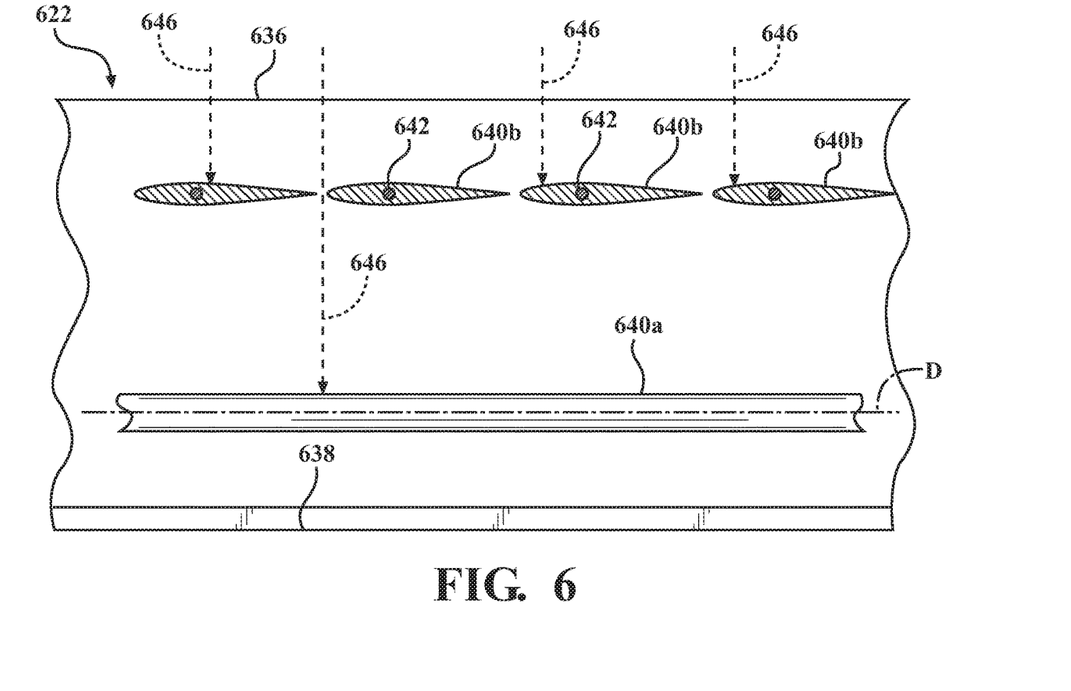
FIG. 6 shows another horizontal sectional view through section 5-5 of the slit-vent fluid delivery module of FIG. 2.

FIG. 6 shows another horizontal sectional view through section 5-5 of the slit-vent fluid delivery module 222 of FIG. 2. The FIG. 6 example is similar to the FIG. 5 example except for the orientation of fluidic control devices 640a-b. Thus, a slit-vent fluid delivery module 622 extends from an inlet 636 to an outlet 638 and includes the transverse fluidic control device 640a rotatable about axis D and the spaced, vertical fluidic control devices 640b having airfoil shapes and rotatable about pivots 642. The fluidic control devices 640a-b operate in a manner similar to that described in respect to the fluidic control devices 340a-b of FIG. 3.

The spaced, vertical fluidic control devices 640b are oriented in a manner that is generally parallel to cross-sectional areas of the inlet 636 and the outlet 638 such that fluid flow paths 646 are generally blocked between the vertical fluidic control devices 640b. Similarly, the transverse fluidic control device 640a is oriented in a manner that is also generally parallel to the cross-sectional areas of the inlet 636 and the outlet 638 such that any fluid flow paths 646 that manage to extend between the vertical fluidic control devices 640b are blocked by the transverse fluidic control device 640a as shown. With the fluidic control devices 640a-b in the described orientations, the fluid flow paths 646 are generally obstructed between the inlet 636 and the outlet 638. These orientations of the fluidic control devices 640a-b can be employed when a user input dictates that no fluid be delivered from a specific region or zone of the slit-vent fluid delivery module 622.

Figure 7:
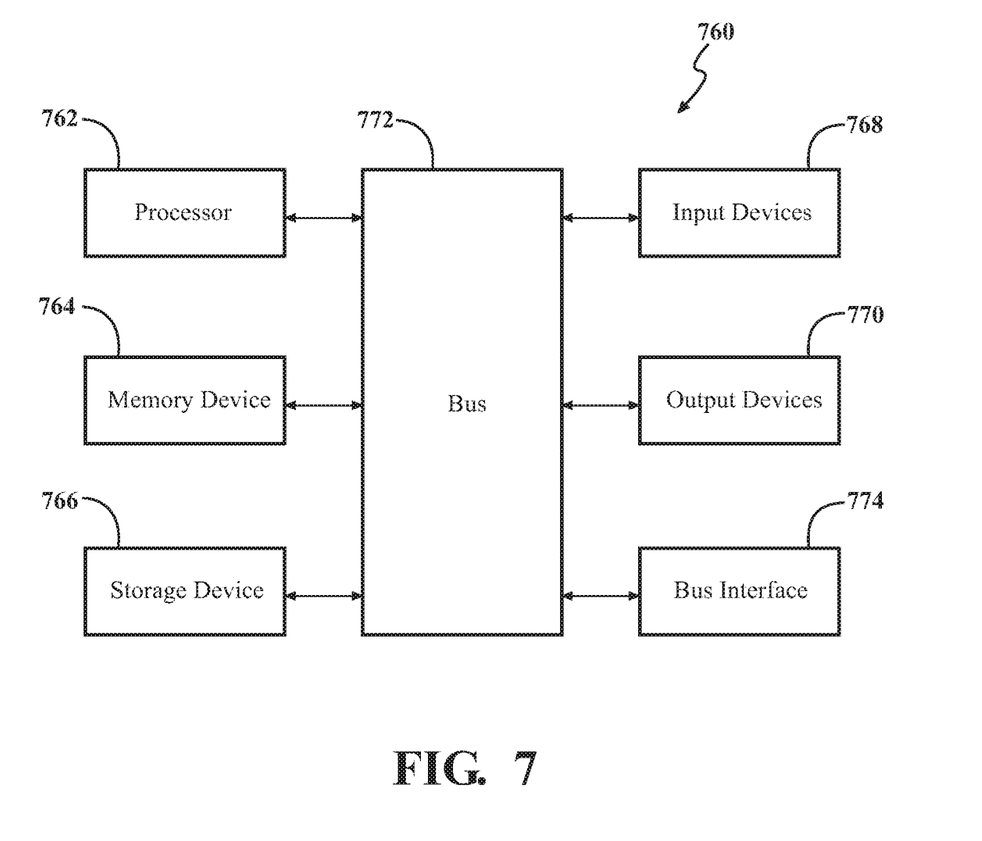
FIG. 7 is a block diagram of an example of a computing device.

FIG. 7 is a block diagram of an example of a computing device 760. The computing device 760 can be a single computing device or a system that includes multiple computing devices working cooperatively. As an example, the computing device 760 could be a vehicle-based computing device such as the ECU 104. Alternatively, the computing device 760 could be a desktop computer, a laptop computer, a tablet, or a mobile device such as a smart phone.

In the illustrated example, the computing device 760 includes a processor 762, a memory device 764, a storage device 766, one or more input devices 768, and one or more output devices 770 which are interconnected by a bus 772. The computing device 760 can also include a bus interface 774 for connecting peripheral devices to the bus 772.

The processor 762 can be any type of device that is able to process or manipulate information, including devices that are currently known and devices that may be developed in the future. As an example, the processor 762 can be a conventional central processing unit (CPU). Although the illustrated example shows a single processor, multiple processors can be used instead of a single processor.

The memory device 764 can be used to store information for immediate use by the processor 762. The memory device 764 includes either or both of a random access memory (RAM) device and a read only memory (ROM) device. The memory device 764 can be used to store information, such as program instructions that can be executed by the processor 762, and data that is stored by and retrieved by the processor 762. In addition, portions of the operating system of the computing device 760 and other applications that are being executed by the computing device 760 can be stored by the memory device during operation of the computing device 760.

The storage device 766 can be used to store large amounts of data persistently. As examples, the storage device 766 can be a hard disk drive or a solid state drive.

The input devices 768 can include any type of device that is operable to generate computer interpretable signals or data in response to user interaction with the computing device 760, such as physical interaction, verbal interaction, or non-contacting gestural interaction. As examples, the input devices 768 can include one or more of a keyboard, a mouse, a touch-sensitive panel with or without an associated display, a trackball, a stylus, a microphone, a camera, or a three-dimensional motion capture device.

The output devices 770 can include any type of device that is able to relay information in a manner that can be perceived by a user. As examples, the output devices 770 can include one or more of an LCD display screen, an LED display screen, a CRT display screen, a printer, an audio output device such as a speaker, or a haptic output device. In some implementations, the output devices 770 include a display screen and the input devices 768 include a touch sensitive panel that is integrated into the display screen to define a touch-sensitive display screen.

The bus 772 transfers signals and/or data between the components of the computing device 760. Although depicted as a single bus, it should be understood that multiple or varying types of buses can be used to interconnect the components of the computing device 760. The bus interface 774 can be any type of device that allows other devices, whether internal or external, to connect to the bus 772. In one implementation, the bus interface 774 allows connection to a controller area network (CAN) bus of a vehicle.

What is claimed is:

1. A fluid delivery module, comprising:
   a housing defining a fluid flow path between an inlet and an outlet;
   a fluidic control device disposed in the housing between the inlet and the outlet and movable to vary a flow direction of the fluid flow path within the housing;
   an outlet treatment formed of a porous material covering the outlet that is controllable to restrict fluid flow exiting the outlet, movable to vary a flow rate of the fluid flow exiting the outlet and movable to vary a flow direction of the fluid flow exiting the outlet; and
   a control unit configured to send commands that move the fluidic control device and that move the outlet treatment according to a fluid delivery profile that dictates a flow pattern of the fluid flow being delivered by the fluid delivery module.

2. The fluid delivery module of claim 1, wherein the flow pattern includes bursts of at least one of semi-random, sinusoidal, or oscillating directional changes in the fluid flow exiting the outlet to simulate a breeze, an open sunroof, or an open window.

3. The fluid delivery module of claim 1, wherein the fluid delivery profile dictates the flow rate, a temperature, and the flow direction of the fluid flow along the fluid flow path and exiting the outlet.

4. The fluid delivery module of claim 1, wherein the fluid delivery profile dictates a humidity level and a fluid type of the fluid flow along the fluid flow path and exiting the outlet, and wherein the fluid type includes at least one of air, water, or scented oil.

5. The fluid delivery module of claim 1, wherein the fluidic control device is spaced from the outlet such that movement of the fluidic control device is blocked from view of a user positioned at a location outside the housing.

6. The fluid delivery module of claim 5, wherein the fluidic control device is movable to modify or block the fluid flow path between the inlet and the outlet in a portion or zone of the housing, and wherein the portion or zone is less than an entirety of the housing.

7. The fluid delivery module of claim 1, wherein the porous material covering the outlet that is controllable to restrict the fluid flow, to is configured to oscillate the fluid flow to achieve the fluid delivery profile, and wherein the outlet treatment blocks visibility of the outlet from a user positioned at a location outside the housing.

8. The fluid delivery module of claim 1, wherein the porous material comprises at least one of a ferromagnetic fabric, a roller-blind cover, or a flexible fabric with openings that vary in size based on stretch of the flexible fabric.

9. The fluid delivery module of claim 1, wherein the fluid delivery profile dictates a scent of the fluid flow along the fluid flow path and exiting the outlet, and wherein the scent gives an impression of salt, sand, sea creature, bonfire, evergreen, or flower.

10. A fluid delivery module, comprising:
    a housing defining a fluid flow path between an inlet and an outlet, the housing including a top surface portion and a bottom surface portion that are movable to vary a flow direction of a fluid flow along the fluid flow path;
    an outlet treatment movable to vary a flow rate of the fluid flow exiting the outlet; and
    a control unit configured to send commands to move at least one of the top surface portion, the bottom surface portion, or the outlet treatment according to a fluid delivery profile that dictates a flow pattern of the fluid flow.

11. The fluid delivery module of claim 10, wherein the top surface portion and the bottom surface portion are movable to vary a cross-sectional area of the outlet to achieve the fluid delivery profile, and wherein the flow pattern is achieved based on moving the top surface portion, the bottom surface portion, or both according to the commands from the control unit.

12. The fluid delivery module of claim 11, wherein the top surface portion is rotatable at an angle α in respect to a top surface of the housing, wherein the bottom surface portion is rotatable at an angle β in respect to a bottom surface of the housing, and wherein the commands from the control unit modify the angles α and β to achieve the fluid delivery profile.

13. The fluid delivery module of claim 10, wherein the outlet treatment comprises a shutter device extendable at least partially across the outlet and controllable to vary a cross-sectional area of the outlet to achieve the fluid delivery profile.

14. The fluid delivery module of claim 10, wherein the outlet treatment comprises a lighting feature that blocks visibility of the outlet from a user positioned at a location outside the housing.

15. The fluid delivery module of claim 10, wherein the outlet treatment comprises a porous material covering the outlet that is controllable to restrict the fluid flow, to change a direction of the fluid flow, or to oscillate the fluid flow to achieve the fluid delivery profile.

16. The fluid delivery module of claim 15, wherein the porous material comprises at least one of a ferromagnetic fabric, a roller-blind cover, or a flexible fabric with openings that vary in size based on stretch of the flexible fabric, and wherein the outlet treatment blocks visibility of the outlet from a user positioned at a location outside the housing.

17. The fluid delivery module of claim 10, wherein the flow pattern includes bursts of at least one of semi-random, sinusoidal, or oscillating directional changes in the fluid flow exiting the outlet to simulate a breeze, an open sunroof, or an open window in an interior of a vehicle in the absence of an open sunroof or an open window.

18. A climate-control method, comprising:
    receiving, at a control unit, information associated with a fluid delivery profile, wherein the fluid delivery profile dictates a flow pattern of bursts including at least one of semi-random, sinusoidal, or oscillating directional changes in a fluid flow exiting an outlet of a fluid delivery module; and
    sending, from the control unit, a command to modify movement of a top surface portion or a bottom surface portion of the fluid delivery module to change a cross-sectional area of the outlet to achieve the flow pattern according to the fluid delivery profile, wherein the fluid delivery module includes an outlet treatment extending between the top surface portion and the bottom surface portion of the fluid delivery module that at least partially covers the outlet, and wherein the outlet treatment is controlled based on the movement of the top surface portion or the bottom surface portion to restrict the fluid flow, to change a direction of the fluid flow, or to oscillate the fluid flow to achieve the flow pattern according to the fluid delivery profile.

19. The method of claim 18, wherein the outlet treatment includes a porous material comprising at least one of a ferromagnetic fabric, a roller-blind cover, or a flexible fabric with openings that vary in size based on stretch of the flexible fabric, and wherein the outlet treatment blocks visibility of the outlet from a user positioned at a location outside the fluid delivery module.

20. The method of claim 19, wherein the outlet treatment includes the flexible fabric that covers the outlet, and wherein the flow pattern is achieved based on movement of the top surface portion or the bottom surface portion stretching the flexible fabric to achieve the flow pattern according to the fluid delivery profile.

* * * * *

UNITED STATES PATENT AND TRADEMARK OFFICE
CERTIFICATE OF CORRECTION

| | |
|---|---|
| PATENT NO. | : 11,535,081 B1 |
| APPLICATION NO. | : 16/940732 |
| DATED | : December 27, 2022 |
| INVENTOR(S) | : John M. Kearney et al. |

It is certified that error appears in the above-identified patent and that said Letters Patent is hereby corrected as shown below:

In the Claims

At Column 9, Claim number 7, Line number 58, "fluid flow, to is configured" should be --fluid flow is configured--.

Signed and Sealed this
Twenty-first Day of February, 2023

Katherine Kelly Vidal
*Director of the United States Patent and Trademark Office*